(12) United States Patent
Takeba (10) Patent No.: US 8,184,240 B2
(45) Date of Patent: May 22, 2012

(54) BACKLIGHT FOR LIQUID CRYSTAL DISPLAY, INCLUDING LAMP CLIP WHICH IS REVERSIBLE TO ACCOMMODATE DIFFERENT LAMP SPACINGS

(75) Inventor: Mitsuhiro Takeba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 66 days.

(21) Appl. No.: 12/865,753

(22) PCT Filed: Dec. 1, 2008

(86) PCT No.: PCT/JP2008/071777
§ 371 (c)(1),
(2), (4) Date: Aug. 2, 2010

(87) PCT Pub. No.: WO2009/122615
PCT Pub. Date: Oct. 8, 2009

(65) Prior Publication Data
US 2010/0328572 A1    Dec. 30, 2010

(30) Foreign Application Priority Data

Apr. 4, 2008    (JP) ................. 2008-097821

(51) Int. Cl.
*G02F 1/13357* (2006.01)
*F21V 19/00* (2006.01)
(52) U.S. Cl. ............. 349/70; 349/58; 349/61; 362/97.2; 362/225
(58) Field of Classification Search .................. None
See application file for complete search history.

(56) References Cited

U.S. PATENT DOCUMENTS

| 3,752,977 | A | * | 8/1973 | Davis | 362/216 |
| 5,003,232 | A | * | 3/1991 | Venderbosch | 315/312 |
| 6,960,002 | B2 | * | 11/2005 | Tsai | 362/225 |
| 8,021,015 | B2 | * | 9/2011 | Yokota et al. | 362/220 |
| 2005/0270803 | A1 | * | 12/2005 | Tsai et al. | 362/632 |
| 2006/0018130 | A1 | | 1/2006 | Lee | |

(Continued)

FOREIGN PATENT DOCUMENTS

EP    1 515 083 A1    3/2005

(Continued)

OTHER PUBLICATIONS

Official Communication issued in International Patent Application No. PCT/JP2008/071777, mailed on Dec. 22, 2008.

(Continued)

*Primary Examiner* — Mike Stahl
(74) *Attorney, Agent, or Firm* — Keating & Bennett, LLP (57) ABSTRACT

Light source lamps can be held at different intervals by a single kind of lamp clip. A straight tube light source lamp (3) arranged on the surface of a backlight chassis (1) is held by a lamp clip (20) fixed to the backlight chassis (1). The lamp clip (20) comprises a base (21) placed on the surface of the backlight chassis (1), lamp grippers (22) formed on the opposite sides of the base (21), and a fixing piece (23). A plurality of lamp grippers (22) are formed on both sides of the base (21) at respective intervals different from each other. A fixing hole (10) engaging with the fixing piece (23) on the surface of the lamp clip (20) not pertaining to lamp holding, and an escape hole (11) for passing the lamp gripper (22) on that surface are formed in the backlight chassis (1).

5 Claims, 9 Drawing Sheets

U.S. PATENT DOCUMENTS

| | | |
|---|---|---|
| 2006/0146512 A1 | 7/2006 | Choi |
| 2007/0053171 A1 | 3/2007 | Park |
| 2008/0278942 A1* | 11/2008 | Tsai et al. ............... 362/235 |
| 2010/0283937 A1* | 11/2010 | Takeba ............... 349/61 |
| 2010/0321926 A1* | 12/2010 | Takeba ............... 362/97.2 |

FOREIGN PATENT DOCUMENTS

| | | |
|---|---|---|
| JP | 2005-019420 A | 1/2005 |
| JP | 2006-032358 A | 2/2006 |
| JP | 2007-073527 A | 3/2007 |
| JP | 2008-292886 A * | 12/2008 |
| JP | 2008-311003 A * | 12/2008 |
| KR | 10-2007-0105916 A | 10/2007 |
| RU | 43 334 U1 | 1/2005 |
| RU | 49 177 U1 | 11/2005 |
| RU | 65 615 U1 | 8/2007 |

OTHER PUBLICATIONS

English translation of Official Communication issued in corresponding Russian Patent Application No. 2010145108, mailed on Feb. 29, 2012.

* cited by examiner

BACKLIGHT FOR LIQUID CRYSTAL DISPLAY, INCLUDING LAMP CLIP WHICH IS REVERSIBLE TO ACCOMMODATE DIFFERENT LAMP SPACINGS

TECHNICAL FIELD

The present invention relates to backlights for a liquid crystal display device.

BACKGROUND ART

With some exceptions, in liquid crystal display devices, a liquid crystal display panel is combined with a backlight. In large liquid crystal display devices such as ones incorporated in television sets, a plurality of straight tube light source lamps are often arrayed at a predetermined interval in a backlight chassis with a view to distributing required amount of light in every corner of a screen. An example of the structure of such large liquid crystal display devices is shown in FIG. 12.

Figure 12:
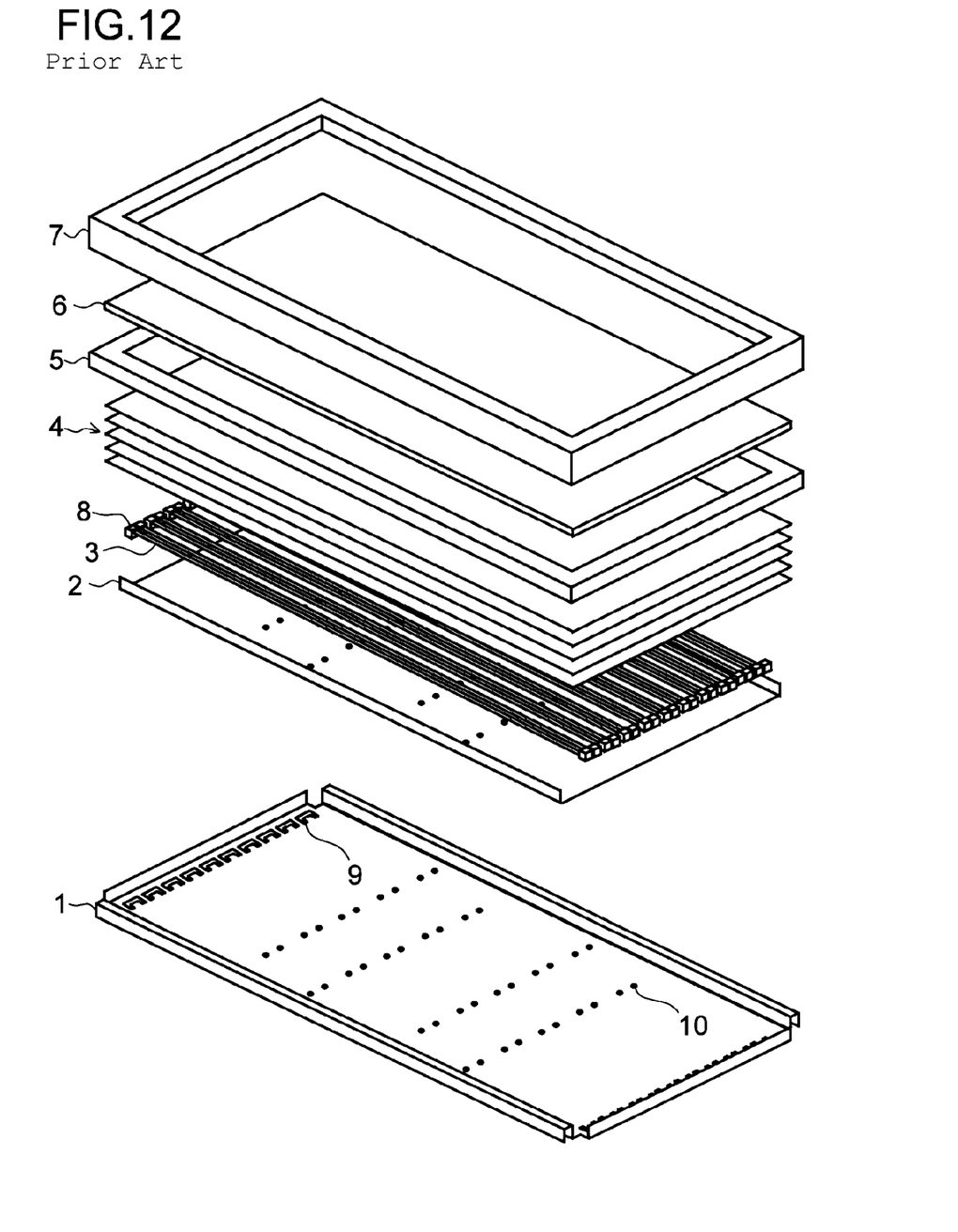
[FIG. 12] An exploded perspective view of components of a conventional liquid crystal display device.

FIG. 12 is an exploded perspective view of components of a liquid crystal display device. Here, the components are arranged assuming the liquid crystal display device is to be assembled such that a display surface faces up. What lies at the bottom is a backlight chassis 1 formed of sheet metal. Over the backlight chassis 1, a reflector sheet 2 is laid. Over the reflector sheet 2, a plurality of light source lamps 3 for backlighting are arranged. Although straight type cold cathode tubes are generally used as light source lamps for backlighting, it is also possible to use any other types of lamps, for example, hot cathode tubes, xenon lamps, and the like.

Over the light source lamps 3, an optical sheet group 4 is arranged, the optical group 4 including a diffusion plate, a lens sheet, a polarizing reflection sheet, a diffusion sheet, etc. The optical sheet group 4 is used for adjusting the characteristics of light which the light source lamps 3 emit.

The optical sheet group 4 is fitted to the backlight chassis 1 with a rectangular frame 5. Over the frame 5, a liquid crystal display panel 6 is arranged. At the top tier, a rectangular bezel 7 is arranged. The bezel 7 serves to fix the liquid crystal display panel 6 with respect to the backlight chassis 1, and also serves to improve the appearance of the liquid crystal display device as a whole.

The backlight chassis 1 is rectangular as seen in a plan view, and has the shape of a tray with its rim erected at its periphery. At both ends of the backlight chassis 1 are formed fitting portions 9 for sockets 8 that are fitted in end parts of the light source lamps 3. Each of the fitting portions 9 is a through hole with a predetermined shape, into which two sockets 8 are inserted. A plurality of fitting portions 9 are formed in line along the shorter sides of the backlight chassis 1. The sockets 8 are electrically connected to a control circuit board in a control box (not shown) provided at the bottom of the backlight chassis 1.

Each of the light source lamps 3 is long, and sounds when vibration is transmitted to it. Moreover, if an impact force acts on the light source lamp 3, there is a risk of breakage. To avoid this, a middle part of the light source lamp 3 is fixed to the backlight chassis 1 with a lamp clip 20.

Figure 14:
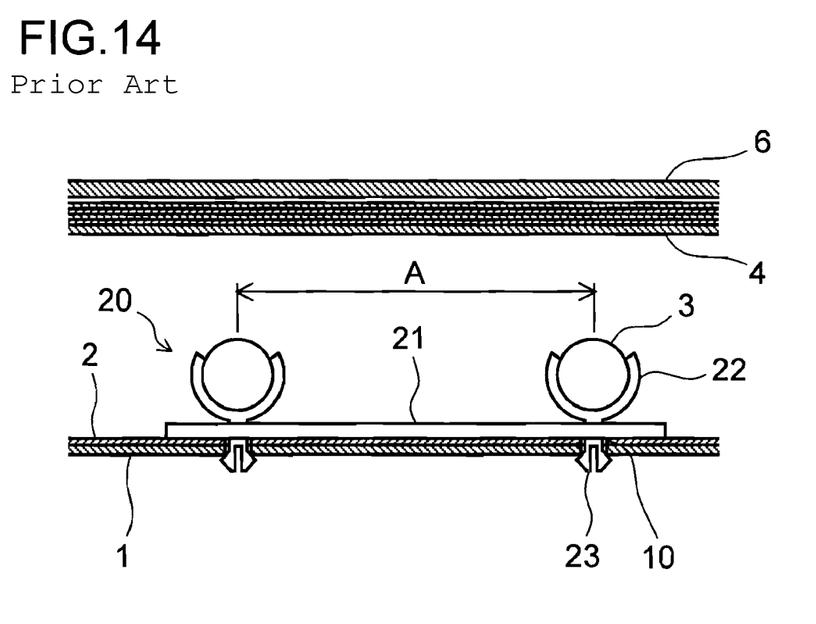
[FIG. 14] A sectional view of a part of the conventional liquid crystal display device.

The structure of a lamp clip 20 is shown in FIG. 14. In the lamp clip 20, a lamp gripper 22 with the shape of "C" open at the top is provided on the upper surface of a plate-shaped base 21 which is rectangular as seen in a plan view. The lamp gripper 22 is for holding a light source lamp 3 with its elasticity; a total of two lamp grippers 22 are provided on the base 21, one near either end of the base 21 in the longitudinal direction of it. On the lower surface of the base 21, two fitting studs 23 which have the shape of a snap stud with a bulged head portion and a slotted groove are formed in the longitudinal direction of the base 21 at an interval. The whole lamp clip 20 is integrally formed of an elastic synthetic resin.

In the backlight chassis 1 and the reflector sheet 2 attached on the upper surface of the backlight chassis 1, a fitting hole 10 for the lamp clip 20 is formed. The fitting hole 10 is for snap-engaging the fitting stud 23, and is arranged in a pair. When the fitting stud 23 is pressed against the fitting hole 10 from above, the bulged head portion of the fitting stud 23 shrinks and passes through the hole. When the head portion of the fitting stud 23 comes out from the lower surface of the backlight chassis 1, it springs back and bulges. In this way, the lamp clip 20 is fixed.

Figure 13:
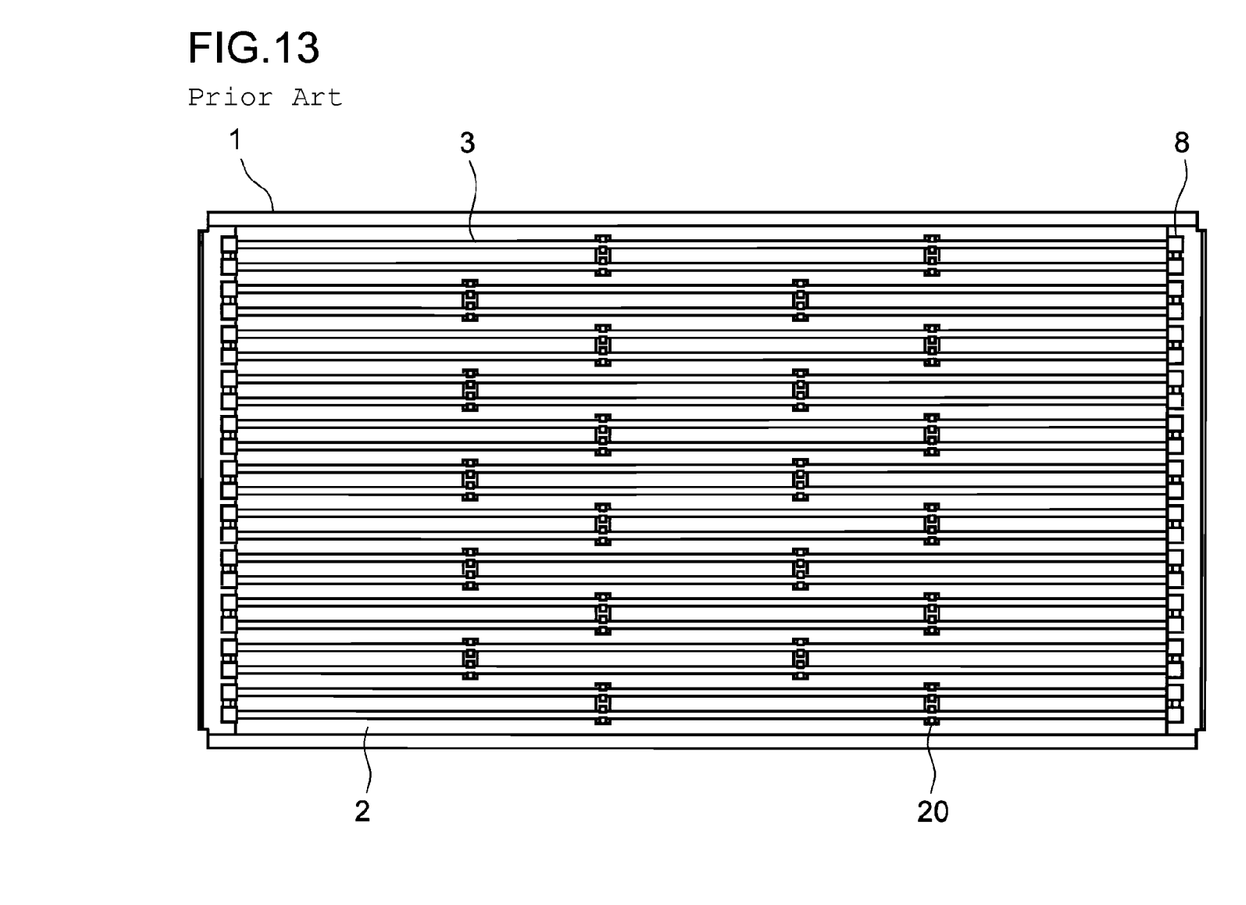
[FIG. 13] A plan view of a conventional backlight chassis.

As shown in FIG. 13, a light source lamp 3 is held by lamp clips 20 at two places somewhere in the middle of itself. One lamp clip 20 holds two light source lamps 3. Thus, the light source lamps 3 are in a pair and, along the length direction of the pair of light source lamps 3, two lamp clips 20 are arranged at an interval.

Holding middle parts of the light source lamp 3 by the lamp clip 20 prevents the light source lamp 3 from vibrating and sounding. Moreover, even if an impact acts on the backlight chassis 1, it is less likely that the light source lamp 3 bends and breaks.

The lamp clip 20 is formed of a synthetic resin with poor thermal conductivity; even so, a predetermined percentage of heat generated by the light source lamp 3 is transmitted to the backlight chassis 1. As a result of heat being taken away, the brightness of the light source lamp 3 is reduced at places where the lamp clips 20 are. If the lamp clips 20 are aligned in the shorter-side direction of the backlight chassis 1, a visible band with lower brightness appears. Thus, to prevent this, the positions of the lamp clips 20 are spread out. Specifically, as shown in FIG. 13, between adjacent pairs of light source lamps 3, the position of the lamp clips 20 is deviated in the length direction of the light source lamp 3, so that the lamp clips 20 are in a staggered arrangement. In this way, parts with lower brightness are spread out, and become less annoying.

Examples of the lamp clip described above are disclosed in Patent Documents 1 and 2.
Patent Document 1: JP-A-2006-32358
Patent Document 2: JP-A-2005-19420

DISCLOSURE OF THE INVENTION

Problems to be Solved by the Invention

Figure 15:
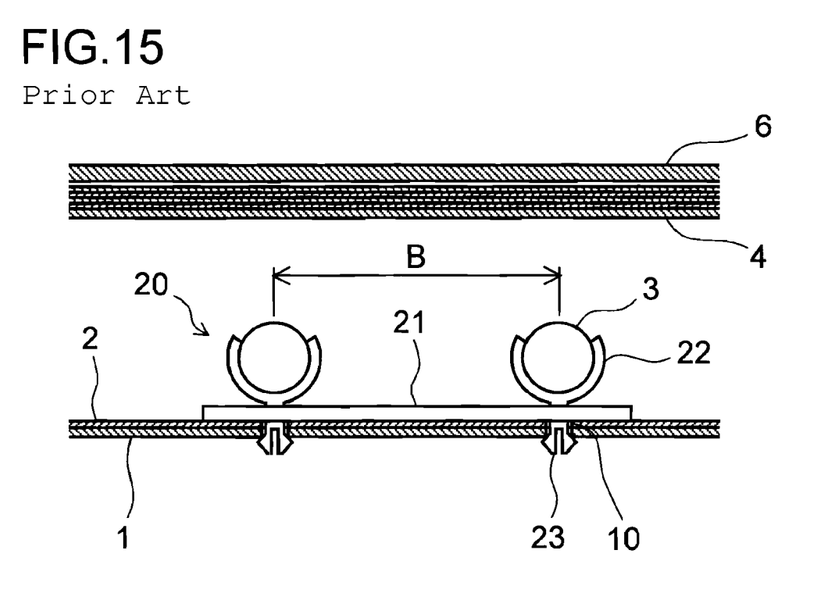
[FIG. 15] A sectional view of a part of the conventional liquid crystal display device, with a lamp clip different from that shown in FIG. 14.

An interval of lamp grippers in a lamp clip may not be the same with any liquid crystal display devices. Depending on the liquid crystal display devices, the required interval differs. The interval of lamp grippers 22 is "A" in FIG. 14; whereas in FIG. 15, a lamp clip 20 is shown in which lamp grippers 22 are arranged at an interval B narrower than the interval A. Not only the interval of the lamp grippers 22, but also the interval of fitting studs 23 is different. There is no interchangeability between the lamp clip 20 shown in FIG. 14 and that shown in FIG. 15. Thus, two types of lamp clips 20 need to be prepared, resulting in costly manufacturing.

The present invention is devised in view of the above problem. An object of the invention is to provide a backlight for a liquid crystal display device, which is so structured in response to the needs for holding straight tube light source lamps at different intervals with a lamp clip of a single type.

Means for Solving the Problem

To achieve the above object, according to the present invention, in a backlight for a liquid crystal display device, a straight tube light source lamp arranged at a surface of a backlight chassis is held by a lamp clip fixed to the backlight chassis. Here, the lamp clip includes a base placed on a surface of the backlight chassis, and a lamp gripper and a fitting stud each of which are formed on each of opposite surfaces of the base. A plurality of the lamp grippers are respectively formed on each of the opposite surfaces of the base at respective intervals that differ depending on which surface the lamp grippers belong to. In the backlight chassis, there are formed a fitting hole engaging with the fitting stud on one of the opposite surfaces of the base, the surface being the one that does not take part in lamp holding, and an escape hole for letting the lamp gripper on that surface pass through.

With this structure, the lamp clip can adapt to a backlight that adopts a different setting of the interval of lamps, by simply turning the lamp clip upside down and fit it to the backlight chassis. Thus, there is no need to prepare two types of lamp clips, and advantageously, only one type of mold is needed. This reduces the costs of production and storage of the components, and simplifies the assembly work.

Moreover, according to the invention, in the above-described backlight for a liquid crystal display device, the lamp grippers are provided in different numbers between each of the opposite surfaces of the base.

With this structure, the lamp clip can adapt to two types of backlight, one requiring a large number of light source lamps, and the other not requiring such a large number of light source lamps.

Moreover, according to the invention, in the above-described backlight for a liquid crystal display device, a plurality of the fitting studs are respectively formed on each of the opposite surfaces of the base of the lamp clip at respective intervals that differ depending on which surface the fitting studs belong to.

With this structure, it is impossible to fit the lamp clip to the backlight chassis unless the orientation of the surfaces of the lamp clip is correct; thus, improper fixing of the lamp clip is avoided.

Moreover, according to the invention, in the above-described backlight for a liquid crystal display device, a support column for supporting an optical sheet group arranged at a rear of a liquid crystal display panel is formed on one or both of the opposite surfaces of the base.

With this structure, it is possible to keep appropriate distance between the optical sheet group and the liquid crystal display panel, and to reduce unevenness in images.

Advantages of the Invention

With the present invention, it is possible to properly use one lamp clip in two ways. Thus, it is possible to cope with many types of liquid crystal display devices with a relatively small number of types of lamp clips, to reduce the costs of production and storage of the lamp clip, and moreover, to simplify assembly work.

LIST OF REFERENCE SYMBOLS 1 backlight chassis
2 reflector sheet
3 light source lamp
4 optical sheet group
6 liquid crystal display panel
10 fitting hole
11, 12 escape hole
20 lamp clip
21 base
22 lamp gripper
23 fitting stud
24 support column

BEST MODE FOR CARRYING OUT THE INVENTION

Figure 1:
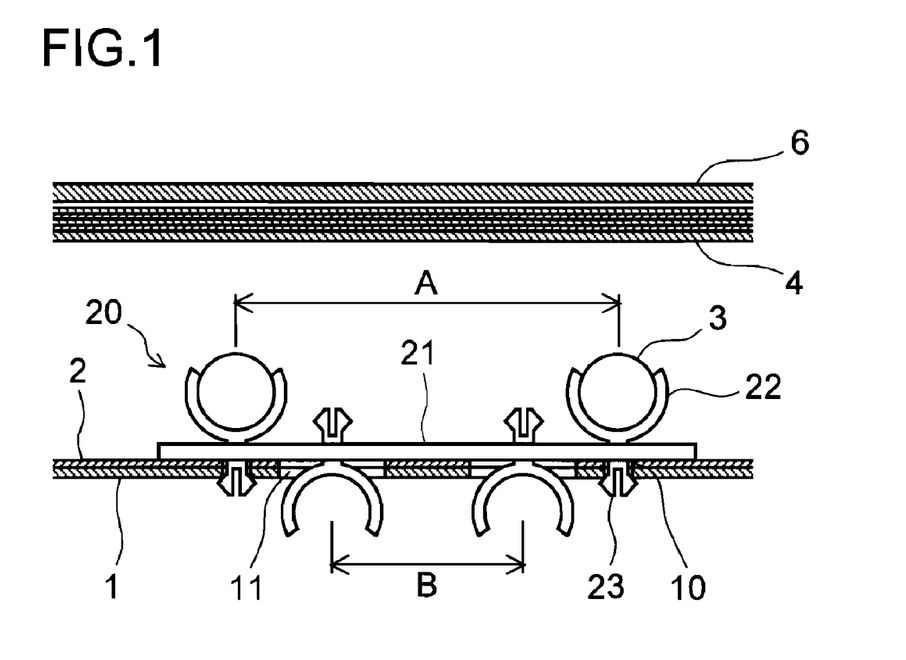
[FIG. 1] A sectional view of a part of a liquid crystal display device according to a first embodiment of the present invention.
Figure 2:
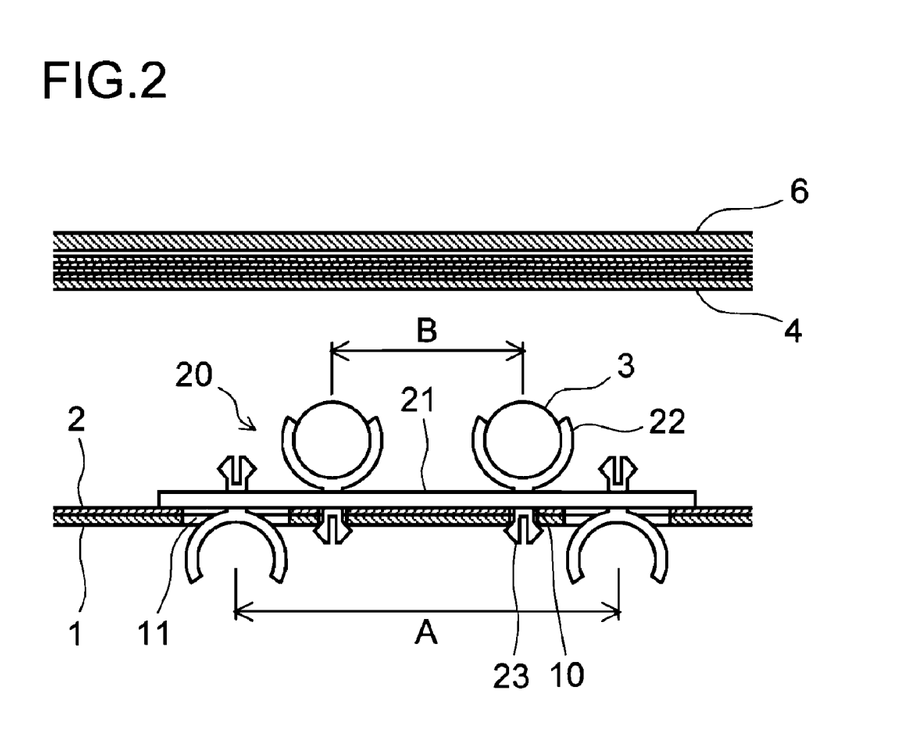
[FIG. 2] A sectional view of a part of the liquid crystal display device according to the first embodiment, with a backlight chassis of a different type.
Figure 3:
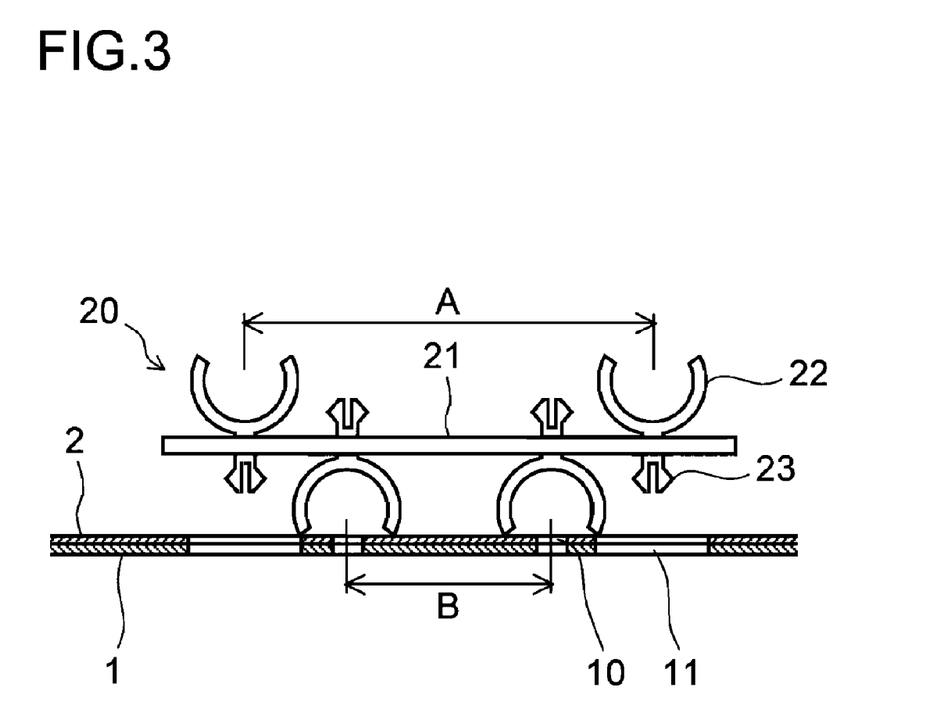
[FIG. 3] A sectional view of a part of the liquid crystal display device according to the first embodiment, illustrating that it is impossible to fit a lamp clip unless the lamp clip is in a proper orientation with respect to a backlight chassis.

A first embodiment of the present invention is shown in FIGS. 1 to 3. In describing the first embodiment, such components as find their counterparts in the conventional structure shown in FIGS. 12 to 15 are identified by common reference signs used in FIGS. 12 to 15, and no description of them will be repeated. This applies also to a second and other embodiments.

According to the first embodiment, in a lamp clip 20, two lamp grippers 22 and two fitting studs 23 are provided on each of opposite surfaces of a base 21. On one surface, the lamp grippers 22 are arranged closer to opposite ends of the base 21 at an interval A; on the opposite surface, the lamp grippers 22 are arranged closer to the middle of the base 21 at an interval B. In addition, to correspond to the lamp grippers 22, respective fitting studs 23 are arranged on the base 21 at places symmetrically to those of the lamp grippers 22 with respect to the base 21. Specifically, two fitting studs 23 project at the interval B in the same direction as two lamp grippers 22 at the interval A; two fitting studs 23 project at the interval A in the same direction as two lamp grippers 22 at the interval B.

When the lamp clip 20 is placed on the backlight chassis 1 with the lamp grippers 22 at the interval A at the top, a setting is achieved in which straight tube light source lamps 3 are arranged at the interval A. When the lamp clip 20 is turned upside down and placed on the backlight chassis 1 with the lamp grippers 22 at the interval B at the top, a setting is achieved in which the light source lamps 3 are arranged at the interval B.

In a backlight adopting the setting in which the light source lamps 3 are arranged at the interval A, as shown in FIG. 1, there is used a combination of the backlight chassis 1 and a reflector sheet 2 that are provided with escape holes 11 for letting the lamp grippers 22 at the interval B pass through. The position of fitting holes 10 is aligned to fitting studs 23 at the interval A that project in the same direction as the lamp grippers 22 at the interval B.

In a backlight adopting the setting in which the light source lamps 3 are arranged at the interval B, as shown in FIG. 2, there is used a combination of the backlight chassis 1 and a reflector sheet 2 that are provided with escape holes 11 for letting the lamp grippers 22 at the interval A pass through. The position of fitting holes 10 is aligned to fitting studs 23 at the interval B that project in the same direction as the lamp grippers 22 at the interval A.

As described above, by turning the lamp clip 20 upside down, it is possible to cope with two types of combinations of the backlight chassis 1 and the reflector sheet 2 by one type of lamp clip 20. Thus, die cost can be cut down, making it possible to reduce the costs of production and storage of the components, and to simplify assembling work.

With the structure of the first embodiment, if an attempt is made to fit the lamp clip 20 shown in FIG. 1, namely the lamp clip 20 in which the fitting studs 23 at the interval A and the lamp grippers 22 at the interval B project from the lower surface, to the combination of the backlight chassis 1 and the reflector sheet 2 in FIG. 2, namely the combination of the backlight chassis 1 and the reflector sheet 2 that are provided with the fitting holes 10 at the interval B and the escape holes 11 at the interval A, it ends in failure as shown in FIG. 3. Thus, it is impossible to fix the lamp clip 20 to the backlight chassis unless the orientation of the surfaces is correct, and thus improper fixing of the lamp clip 20 is avoided.

Figure 4:
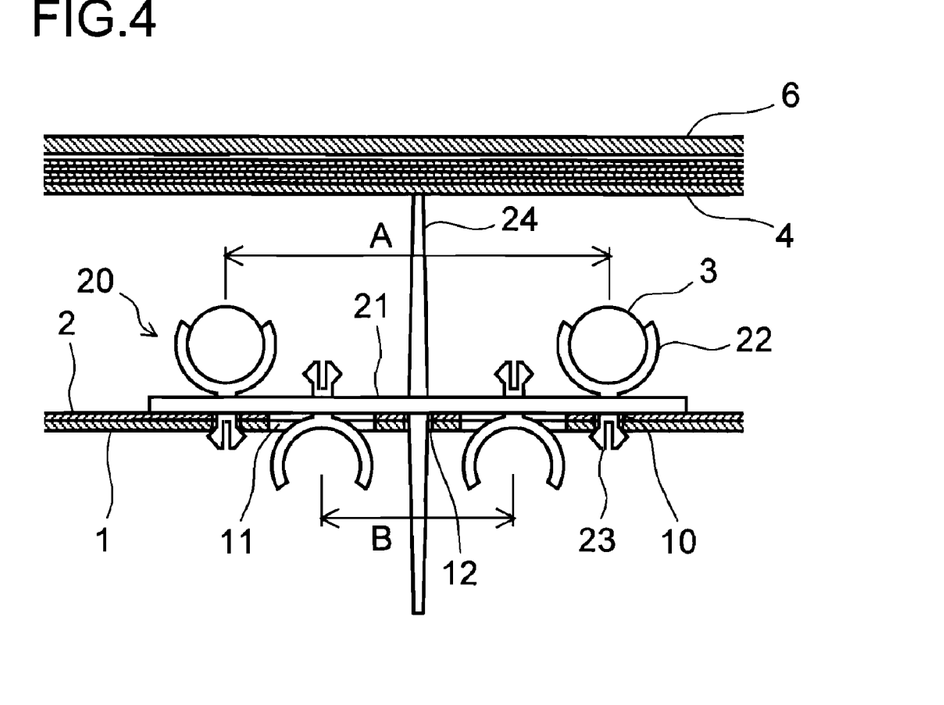
[FIG. 4] A sectional view of a part of a liquid crystal display device according to a second embodiment of the present invention.
Figure 5:
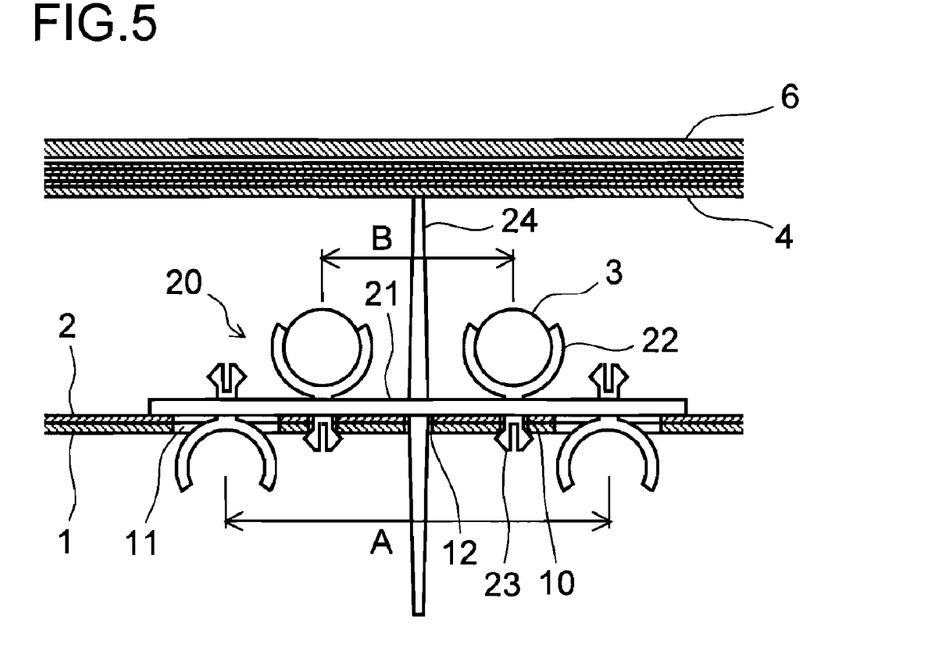
[FIG. 5] A sectional view of a part of the liquid crystal display device according to the second embodiment, with a backlight chassis of a different type.

A second embodiment of the invention is shown in FIGS. 4 and 5. The second embodiment is the first embodiment with the following modification applied. Specifically, at the center of either surface of a base 21 of a lamp clip 20, a support column 24 for supporting an optical sheet group 4 is formed. In a backlight chassis 1 and a reflector sheet 2, escape holes 12 for letting the support column 24 pass through is formed.

Supporting the optical sheet group 4 with the support column 24 as described above makes it possible to keep appropriate distance between the optical sheet group 4 and the liquid crystal display panel 6, and to reduce unevenness in images.

The position of the support column 24 is not limited to the center of the base 21. It may be another place. The number of the support column 24 is not limited to one on either surface of the base 21. It may be two or more; it is also possible to provide one on one surface and two or more on the other surface. Also, one surface may not be provided with the support column 24. In addition, the support column 24 may be formed integral with the base 21, or a separately formed member may be fitted to the base 21.

Figure 6:
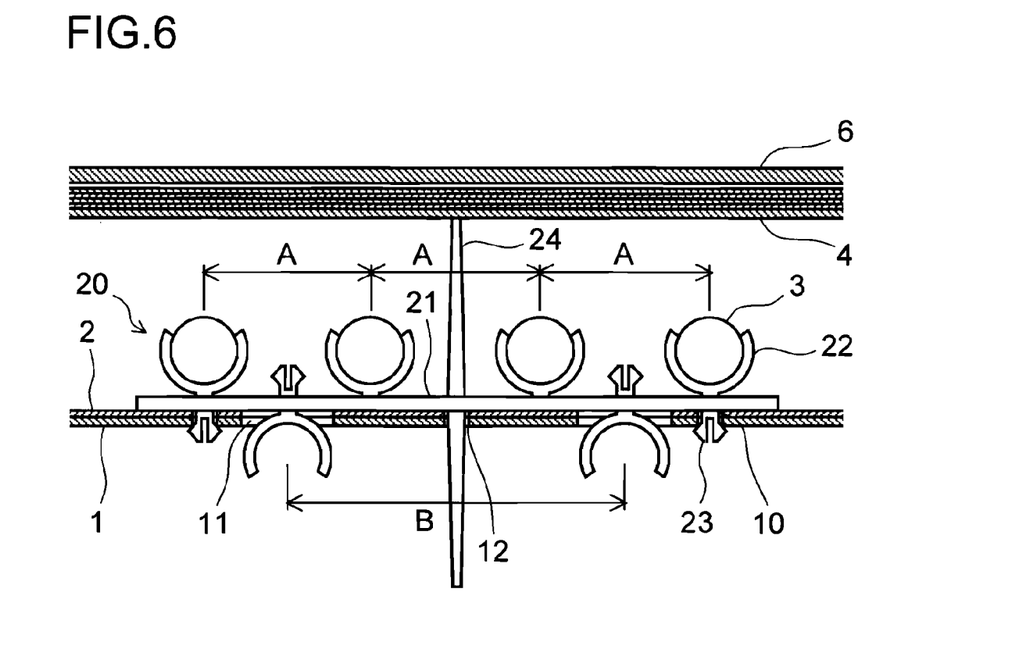
[FIG. 6] A sectional view of a part of a liquid crystal display device according to a third embodiment of the present invention.
Figure 7:
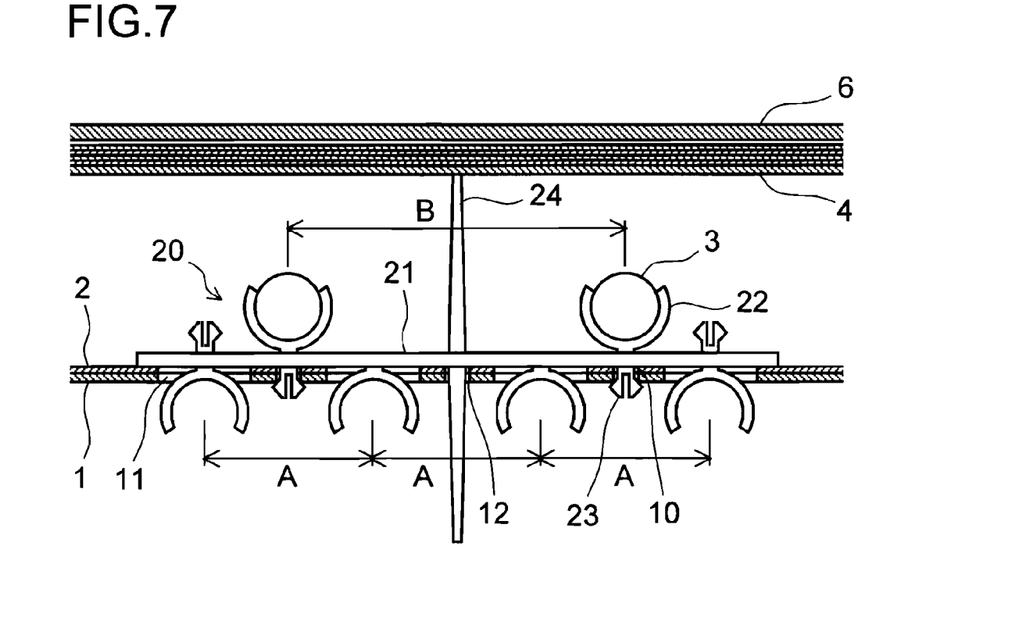
[FIG. 7] A sectional view of a part of the liquid crystal display device according to the third embodiment, with a backlight chassis of a different type.

A third embodiment of the present invention is shown in FIGS. 6 and 7. The third embodiment is the second embodiment with the following modification applied. Specifically, on one surface of a base 21 of a lamp clip 20, four lamp grippers 22 are arranged in a row at intervals A; on the opposite surface, two lamp grippers 22 are arranged at an interval B. To correspond to two lamp grippers 22 at both ends of the row of four lamp grippers 22 at the intervals A and two lamp grippers 22 at the interval B, fitting studs 23 are arranged at the places on the base 21 symmetrically to those of the lamp grippers 22 with respect to the base 21. Specifically, two fitting studs 23 project at the interval B in the same direction as the lamp grippers 22 at the interval A, and two fitting studs 23 project at an interval three times the interval A in the same direction as the lamp grippers 22 at the interval B.

In a backlight adopting a setting in which light source lamps 3 are arranged at the intervals A, as shown in FIG. 6, there is used a combination of a backlight chassis 1 and a reflector sheet 2 that are provided with escape holes 11 for letting the lamp grippers 22 at the interval B pass through. The position of fitting holes 10 is aligned to two fitting studs 23 at the interval three times the interval A that project in the same direction as the lamp grippers 22 at the interval B.

In a backlight adopting a setting in which light source lamps 3 are arranged at the interval B, as shown in FIG. 7, there is used a combination of a backlight chassis 1 and a reflector sheet 2 that are provided with escape holes 11 for letting lamp grippers 22 at the intervals A pass through. The position of fitting holes 10 is aligned to two fitting studs 23 at the interval B that project in the same direction as the lamp grippers 22 at the intervals A.

Differentiating the number of the lamp grippers 22 between the opposite surfaces of the base 21 of the lamp clip 20 as described above makes it possible to cope with both a backlight that requires a large number of light source lamps 3 and a backlight that does not require such a large number of light source lamps 3.

Figure 8:
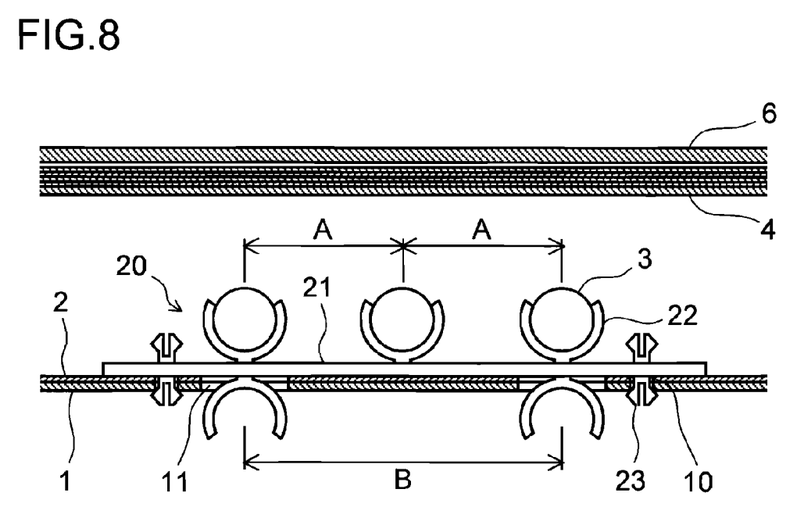
[FIG. 8] A sectional view of a part of a liquid crystal display device according to a fourth embodiment of the present invention.
Figure 9:
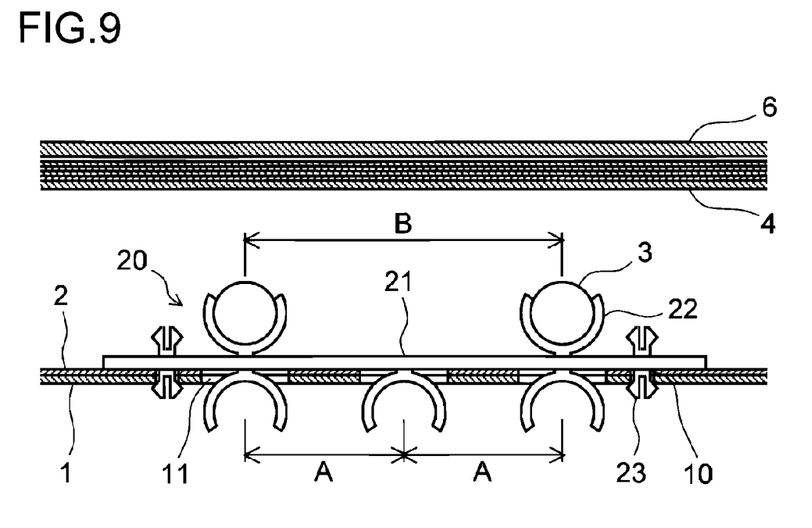
[FIG. 9] A sectional view of a part of the liquid crystal display device according to the fourth embodiment, with a backlight chassis of a different type.

A fourth embodiment of the present invention is shown in FIGS. 8 and 9. In a lamp clip 20 according to the fourth embodiment, three lamp grippers 22 and two fitting studs 23 are arranged on one surface of a base 21, and two lamp grippers 22 and two fitting studs 23 are arranged on the opposite surface. The former three lamp grippers 22 are arranged in a row at intervals A, and the latter two lamp grippers 22 are arranged at an interval B twice the interval A. The latter two lamp grippers 22 are located symmetrically to the row ends of the former three lamp grippers 22 with respect to the base 21.

What is distinct in the fourth embodiment from the embodiments described above is the position of the fitting studs 23. Specifically, on either of opposite surfaces of the base 21, two fitting studs 23 are arranged further outward from the lamp grippers 22, and those fitting studs 23 are located symmetrically to the fitting studs 23 on the opposite surface with respect to the base 21.

Since the position of the fitting studs 23 is as described above, in a backlight adopting a setting in which light source lamps 3 are arranged at the interval A, and also in a backlight adopting a setting in which light source lamps 3 are arranged at the interval B, the position of fitting holes 10 may be the same and the number of escape holes 11 may only has to be changed.

Figure 10:
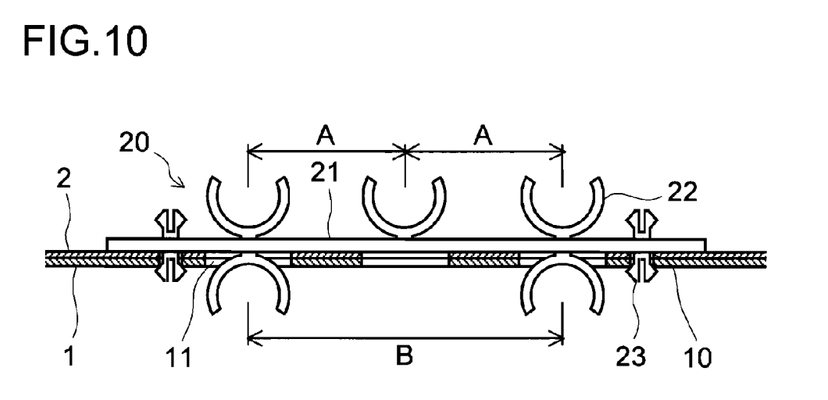
[FIG. 10] A sectional view of a part of a liquid crystal display device, illustrating a problem that can arise in the fourth embodiment.

In the fourth embodiment, there is a point to consider. Specifically, when the interval B of the lamp grippers 22 on one surface is an integral multiple of the interval A of the lamp grippers 22 on the opposite surface, there may be a case in which the lamp clip 20 is fixed in a wrong orientation as shown in FIG. 10. The combination of the backlight chassis 1 and the reflector sheet 2 shown in FIG. 10 is the same as that shown in FIG. 9. Thus, three lamp grippers 22 at the intervals A are supposed to face down and placed in three escape holes 11. However, two lamp grippers 22 at the interval B are placed in the outermost escape holes 11, and three lamp grippers 22 at the intervals A are facing up.

Figure 11:
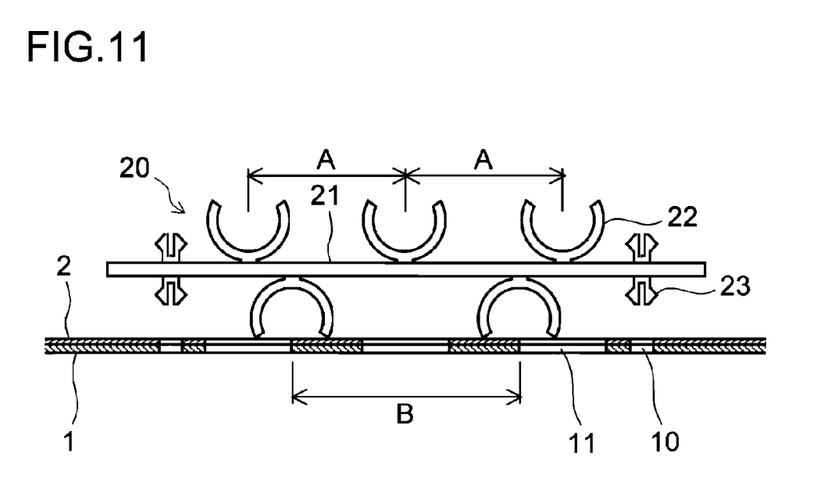
[FIG. 11] A sectional view of a part of a liquid crystal display device, showing a solution to the problem shown in FIG. 10.

To prevent this, the interval B is deviated from the integral multiple of the interval A as shown in FIG. 11, so that the lamp grippers 22 at the interval B are prevented from entering the escape holes 11 at the intervals A.

The embodiments of the present invention are described above, and it is to be understood that many other modifications and variations are possible within the scope of the present invention.

INDUSTRIAL APPLICABILITY

The present invention finds wide application in liquid crystal display devices employing straight tube light source lamps as a backlight.

The invention claimed is:

1. A backlight for a liquid crystal display device, in which a straight tube light source lamp arranged at a surface of a backlight chassis is held by a lamp clip fixed to the backlight chassis,
   wherein the lamp clip includes a base placed on a surface of the backlight chassis, and a lamp gripper and a fitting stud each of which are formed on each of opposite surfaces of the base;
   wherein a plurality of the lamp grippers are respectively formed on each of the opposite surfaces of the base at respective intervals that differ depending on which surface the lamp grippers belong to; and
   wherein, in the backlight chassis, there are formed a fitting hole engaging with the fitting stud on one of the opposite surfaces of the base, the surface being the one that does not take part in lamp holding, and an escape hole for letting one of the plurality of lamp grippers on that surface pass through.

2. The backlight for a liquid crystal display device according to claim 1,
   wherein the lamp grippers are provided in different numbers between each of the opposite surfaces of the base.

3. The backlight for a liquid crystal display device according to claim 1,
   wherein a plurality of the fitting studs are respectively formed on each of the opposite surfaces of the base of the lamp clip at respective intervals that differ depending on which surface the fitting studs belong to.

4. The backlight for a liquid crystal display device according to claim 1,
   wherein a support column for supporting an optical sheet group arranged at a rear of a liquid crystal display panel is formed on one or both of the opposite surfaces of the base.

5. The backlight for a liquid crystal display device according to claim 2,
   wherein a plurality of the fitting studs are respectively formed on each of the opposite surfaces of the base of the lamp clip at respective intervals that differ depending on which surface the fitting studs belong to.

* * * * *